United States Patent
Zeppieri

[15] 3,706,917
[45] Dec. 19, 1972

[54] CONTROLLED WELDING TECHNIQUE FOR A SILVER CONTAINER

[72] Inventor: Dominick John Zeppieri, North Adams, Mass.

[73] Assignee: Sprague Electric Company, North Adams, Mass.

[22] Filed: Sept. 28, 1971

[21] Appl. No.: 184,398

[52] U.S. Cl. .....................317/230, 29/570, 317/242
[51] Int. Cl. ..................................................H01g 9/08
[58] Field of Search......317/230, 231, 232, 233, 242; 29/570

[56] References Cited

UNITED STATES PATENTS

| | | | |
|---|---|---|---|
| 2,834,926 | 5/1958 | Boae | 317/230 |
| 3,015,758 | 1/1962 | Hildebrandt et al | 317/230 |
| 3,243,316 | 3/1966 | O'Nan | 317/230 |
| 3,534,230 | 10/1970 | Krasienko | 317/230 |

*Primary Examiner*—James D. Kallam
*Attorney*—Arthur G. Connolly et al.

[57] ABSTRACT

A technique for welding which controls the depth of penetration of a nickel wire into the bottom of a silver capacitor can having a thickness range of approximately 0.010 to 0.020 inch. The technique limits and advantageously controls the formation of columnar structure in the weld area. This control is achieved by forming serrations or the like on the bottom of the can prior to the attachment of the nickel wire to be welded thereon, so that a proper heat balance is created thereon that permits a strong bond between the nickel wire and the silver can to be formed.

6 Claims, 3 Drawing Figures

PATENTED DEC 19 1972 3,706,917
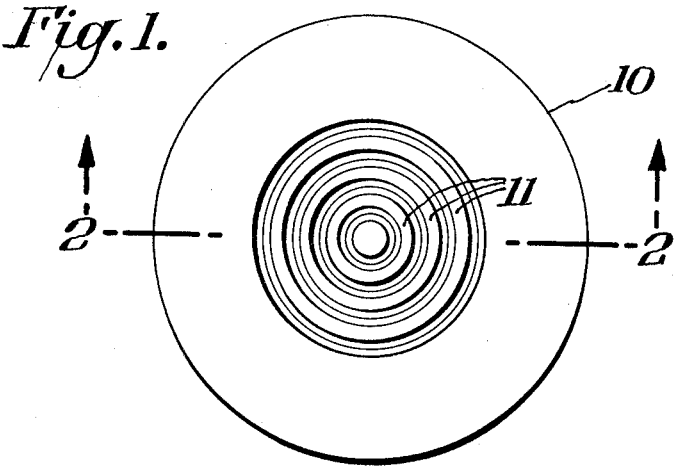
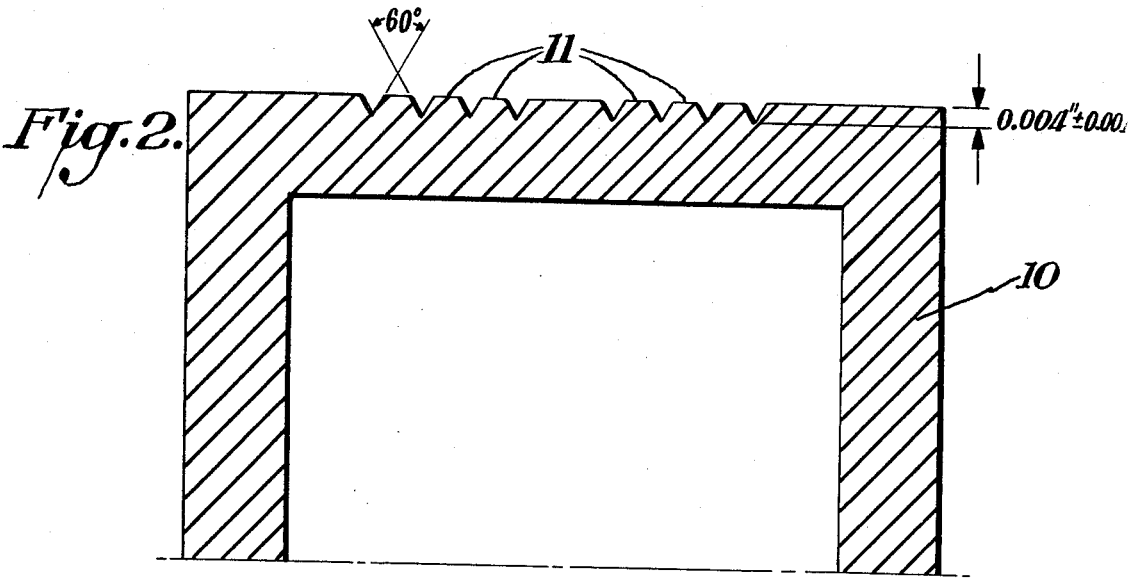
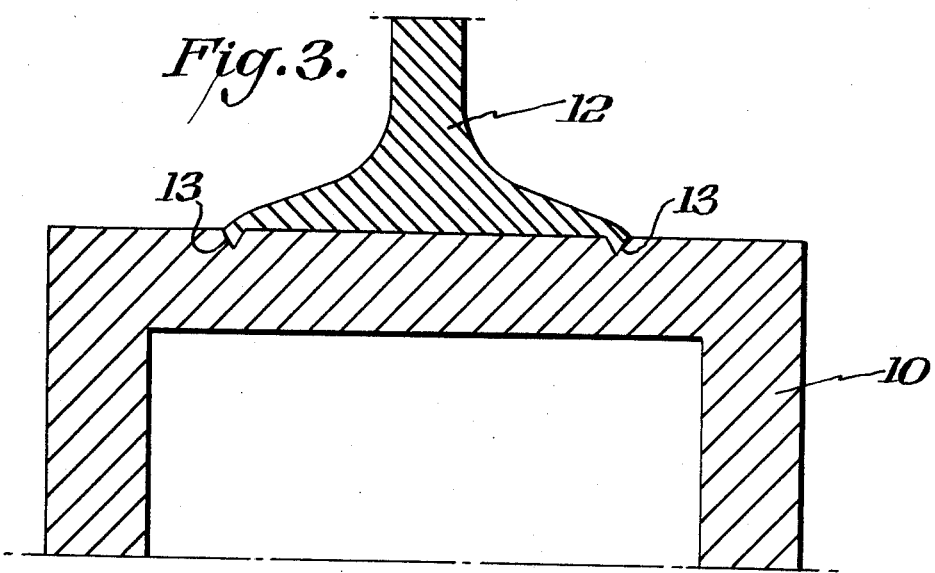

CONTROLLED WELDING TECHNIQUE FOR A SILVER CONTAINER

BACKGROUND OF THE INVENTION

This invention relates to a controlled welding method, and more particularly to a technique for welding nickel to silver while limiting and controlling the subsequent formation therein of columnar structure. Columnar structure is a coarse structure of parallel columns of grains which are caused by highly directional solidification resulting from sharp thermal gradients. Ordinarily this is not a detriment to many welding operations, however, it is a detriment to tantalum wet capacitor systems that use highly acidic electrolytes. For example, a system using 40 percent sulfuric acid as an electrolyte has leakage problems because the acid attacks any columnar structure present.

When two metals such as silver and nickel, being so completely different in thermal characteristics, are welded together by conventional techniques, an improper heat balance results. An improper heat balance is a condition in which one of the two metals to be welded melts at a greater rate than the other causing columnar structure and poor welds. Specifically, upon welding the silver becomes generally molten and causes some nickel to be dispersed therethrough all the way to the inner surface of a silver capacitor can. This phenomenon makes a silver container having a nickel lead wire welded thereto susceptible to a corrosive attack of the nickel contaminated silver by the acid electrolyte. Tantalum wet capacitors utilize this construction, and are used in high precision and high priced equipment where leaking sulfuric acid can have disastrous effects thereon.

Prior art attempts to overcome this vexing problem have been unsuccessful and have included conventional resistance welding and percussion welding. However, both of these welding processes produce columnar structure and neither process alone offers a proper solution to the problem of leakage.

Accordingly, it is an object of the present invention to provide a controllable method of welding thermally dissimilar metals, such as silver and nickel.

It is another object of this invention to correct the improper heat balance so as to provide a grain structure in the weld area that is devoid of columnar structure.

It is a further object of the present invention to provide a method of welding a nickel lead wire to a silver container in such a manner that the container will not leak when a highly acidic electrolyte is placed therein.

SUMMARY OF THE INVENTION

Serrations are formed on the bottom exterior of a silver container at the point where a nickel wire is to be welded thereon. These serrations permit the achievement of a proper heat balance when two such thermally different metals are welded together by conventional welding processes. The serrations on the silver cause a build up of a higher than normal current density thereon, and this in turn contributes to a proper heat balance. The heat produced from the welding operation is concentrated on the projections formed by the serrations of this invention. For a median can-base thickness of approximately 13 mils, satisfactory results are obtained when there is approximately 5.0 mils of unaffected silver between the electrolyte and the nickel lead wire.

BRIEF DESCRIPTION OF THE DRAWINGS

FIG. 1 is a plan view of the serrated surface of a silver container;

FIG. 2 is a cross-sectional view of the silver can showing the serrations thereon; and FIG. 3 is a cross-sectional view of a capacitor can having a lead attached thereto.

DETAILED DESCRIPTION OF THE PREFERRED EMBODIMENTS

A silver capacitor can has serrations or projections impressed or embossed on the closed end thereof by any conventional technique known to one skilled in the art, such as by a punch and die. These serrations limit and control the formation of columnar structure when a silver capacitor can has a thermally different metal lead wire welded thereto.

In FIG. 1 there is shown the bottom exterior surface of a silver capacitor can 10 having serrations or projections 11 formed thereon in the form of concentric rings. These ringed serrations can be formed by any conventional embossing or impressing technique known to one skilled in the art. FIG. 2 shows the approximate depth of the serrations 11 into the can 10. The depth should be approximately 0.004 ± 0.001 inch into the bottom of the can, for cans having a surface that is at least 0.010 inch thick. If there is no unaffected silver area between the interior surface of the can and the nickel lead, leakage problems are confronted.

FIG. 2 also shows typical dimensions of serrations made in a capacitor can. The distance between serrations herein is 0.0029 inch, while the angle measured by the slope of adjacent serrations is approximately 60°. However, this is only typical and should not be considered mandatory requirements. The serrations should be made in such a manner that the diameter of the nickel wire should substantially cover the serrations when welded to the can, and the angle of slope described by adjacent serrations should permit a plurality of these serrations to be formed in an area small enough to be substantially covered by the diameter of the wire lead welded thereon.

The serrations need not necessarily be in the form of concentric rings. Alternatively, cross-hatched serrations may be used for the purposes of this invention. These serrations may be formed as by a punch and die or other technique known to one skilled in the art. Again, the penetration of the serration should be approximately 0.004 ± 0.001 inch on any size can, as this depth of serration is sufficient to concentrate enough heat in the serrated area so as to produce a proper heat balance between the two metals to be joined herein.

An opposed electrode welding process is used to attach the lead wires to the silver cans. In the process, the can is connected physically and electrically to a first electrode of a certain polarity, and a lead wire having contact to a second electrode of opposed polarity is brought into contact briefly with the silver can. Upon touching the serrated portion of the can the nickel wire is welded instantaneously into place, advantageously penetrating only to the depth of the serrations. This process takes place rapidly because the serrations in the can cause the build-up thereon of a high current density, and therefore a highly concentrated "hot" area.

It has been discovered that when such serrations are formed on the capacitor cans prior to the welding operation, the heat generated during the operation is concentrated at the projections formed thereby. This provides the needed heat balance which allows the formation of a strong consistent weld bond, and at the same time limits and controls the formation of columnar structure and the depth of penetration of the lead into the can. Ordinarily, silver, being a good conductor, does not build up any heat at any one point, however, the serrations of this invention cause current used in the welding operation to be forced through the projected areas, and a higher current density is localized at these points producing a proper heat balance between the two metals to be welded together.

FIG. 3 shows a capacitor can 10 having a nickel lead wire 12 welded thereto, completely covering the serrated configuration formed for the purposes of this invention. Microscopic observation will, however, show that the outer perimeter of serrations 13 that had been made on the can still remain under the welded lead wire, while the inner serrations have fused with the lead to form a strong bond therewith. Cans formed thusly will not leak when a highly acidic electrolytic solution is used therein.

The above-described specific embodiments of the invention have been set forth for the purposes of illustration. It will be apparent to those skilled in the art that various modifications may be made in the geometrical design of the serrations or projections formed without departing from the principles of this invention as pointed out and disclosed herein. For that reason, it is not intended that the invention should be limited other than by the scope of the appended claims.

What is claimed is:

1. A method of welding a metal lead wire to a silver container, where said metal lead wire has thermal characteristics that differ from silver, comprising:
   forming serrations on the bottom exterior surface of a silver container, said serrations being of such a size as to be completely covered by a metal wire welded thereto;
   placing said serrated container in electrical contact with a first electrode of a certain polarity;
   affixing a metal lead wire to a second electrode of a polarity opposing that of said first electrode, said metal lead wire being of a metal that has thermal characteristics that differ from silver; and
   contacting said metal lead wire to said container at the point of said serrations causing a high current density to be localized at said serrations and a welded bond to be formed thereon.

2. The method of claim 1 wherein said serrations are formed to have a depth of penetration in the silver container of $0.004 \pm 0.001$ inch.

3. The method of claim 2 wherein said metal lead wire is nickel, and said serrations are formed as concentric rings.

4. The method of claim 2 wherein said metal lead wire is nickel, and said serrations are formed as a cross-hatched impression on the silver can.

5. An electrolytic capacitor container comprising: a silver container having an open end and a closed end; a metal lead wire attached to said silver container at the closed end, said metal lead wire is of a metal having thermal characteristics that differ from silver, and said silver container having serrations on said closed end under the outer perimeter of said metal lead wire.

6. The container of claim 5 wherein said metal lead wire is nickel, and said serrations are ring shaped.

* * * * *